United States Patent [19]

Steckel

[11] 4,428,327
[45] Jan. 31, 1984

[54] INSECTICIDE EAR TAG

[76] Inventor: Lester M. Steckel, Box 235, Taylor, Nebr. 68879

[21] Appl. No.: 408,472

[22] Filed: Aug. 16, 1982

[51] Int. Cl.³ .................. A01K 13/00; A01K 29/00
[52] U.S. Cl. ........................................ 119/156; 40/301
[58] Field of Search .................... 119/156; 40/301, 302

[56] References Cited

U.S. PATENT DOCUMENTS 3,949,708  4/1976  Meeks ................................ 119/156
4,359,015  11/1982  Ritchey ............................. 119/156

Primary Examiner—Hugh R. Chamblee
Attorney, Agent, or Firm—Zarley, McKee, Thomte, Voorhees & Sease

[57] ABSTRACT

An animal ear tag comprising a flat identification area having at least one flat strap extending therefrom adapted to be connected to the animal's ear. An insecticide impregnated flat member is detachably secured to at least one side of the flat identification area. In the preferred embodiment, a shoulder extends outwardly from the flat identification area around the periphery of the flat member to prevent the flat member from being inadvertently detached therefrom. In the preferred embodiment, a plurality of spaced apart pegs extend outwardly from the flat identification area within the area defined by the shoulder. The flat member has a plurality of openings formed therein which detachably receive the pegs. The insecticide impregnated flat member may be easily replaced when the insecticide in the flat member has lost its potency.

1 Claim, 4 Drawing Figures

INSECTICIDE EAR TAG

BACKGROUND OF THE INVENTION

Animal ear tags are commonly secured to an animal's ear to aid in the identification thereof. Many types of ear tags have been previously described such as in my previous U.S. Pat. No. 4,176,482. Recently, it has been found advantageous to impregnate the ear tag with a suitable insecticide to aid in the control of face flies, etc. One such ear tag having insecticide associated therewith is marketed by Y-Tex Corporation, 1825 Big Horn Road, Cody, Wyo. 82414 under the trademark Gard-Star insecticide ear tags. The entire ear tag in the Y-Tex ear tag is impregnated with insecticide. However, the insecticide in the ear tag retains its potency or strength for only a few months and the entire ear tag must be replaced if the animal is to be protected with insecticide. The necessity of replacing the complete ear tag is not only a huge expense but the replacement of the ear tag involves considerable labor since the old tag must be cut away and replaced with a new tag. The replacement of the ear tag also involves the step of penetrating the ear with an attachment pin.

Therefore, it is a principal object of the invention to provide an improved ear tag having insecticide associated therewith.

A further object of the invention is to provide an ear tag having a removable insecticide impregnated member attached thereto which may be replaced when the insecticide loses it effectiveness.

Still another object of the invention is to provide an ear tag having an insecticide impregnated member secured thereto including means for preventing the inadvertant removal of the insecticide member.

Still another object of the invention is to provide an animal ear tag which is economical of manufacture, durable in use and refined in appearance.

SUMMARY OF THE INVENTION

Figure 1:
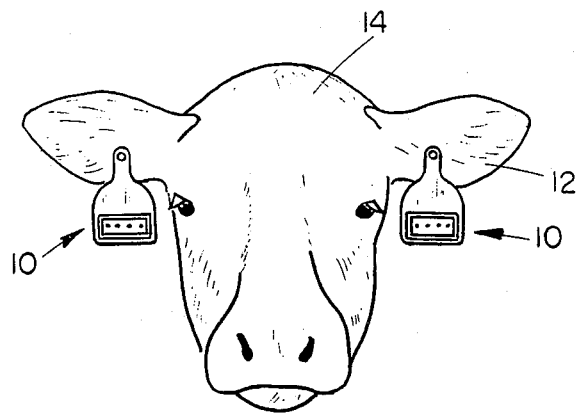
FIG. 1 is a frontal view of an animal having a pair of the ear tags attached thereto.

An insecticide ear tag for use on an animal such as a cow or the like is described and includes a flat identification area having an attachment strap extending therefrom which is adapted to be secured to the animal's ear in conventional fashion. An insecticide impregnated flat member is removably secured to at least one side of the flat identification area. When the insecticide impregnated flat member loses its potency, it may be replaced without the necessity of removing the tag from the animal's ear.

DESCRIPTION OF THE PREFERRED EMBODIMENT

The numeral 10 refers generally to the ear tag of this invention which is designed to be attached to the ear 12 of an animal 14 such as a cow 14. Preferably, the tags 10 are secured to both of the ears of the animal.

Tag 10 includes a flat identification area 16 at one side thereof upon which identification indicia is placed such as in my previous U.S. Pat. No. 4,176,482. Tag 10 includes a strap portion 18 having a mounting collar provided thereon through which is inserted a conventional ear tagging pin to facilitate attachment of the tag to the animal's ear.

Figure 2:
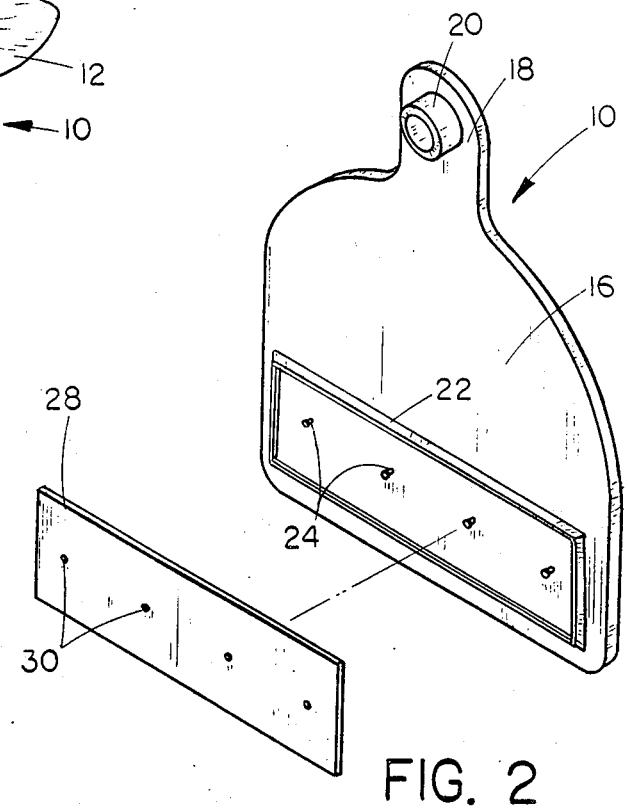
FIG. 2 is an exploded perspective view of the ear tag.
Figure 3:
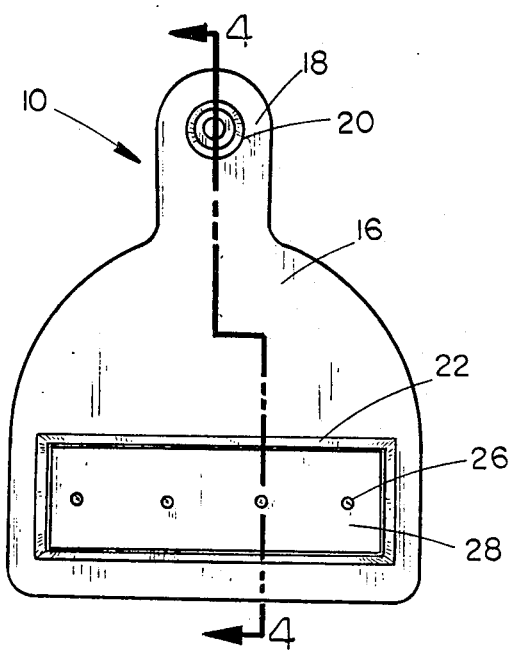
FIG. 3 is a plan view of the ear tag.
Figure 4:
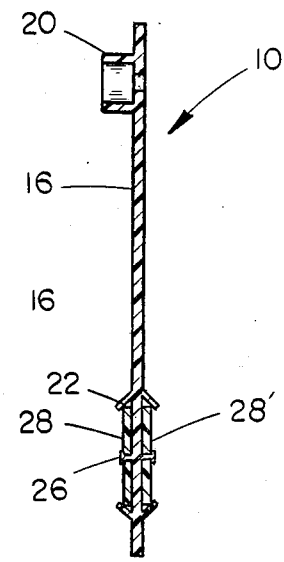
FIG. 4 is a sectional view seen on lines 4—4 of FIG. 3.

The numeral 22 refers to a rectangular shoulder extending at an angle outwardly from the identification area 16 as best seen in FIGS. 2–4. A plurality of conventional attachment tags 24 extend outwardly from the tag within the shoulder 22 and have enlarged head portions 26 thereon. The attachment tags 24 and the head portions thereon are conventional in design and are of the type commonly found on the adjustment straps of caps or the like.

The numeral 28 refers to a flat member which has a plurality of openings 30 formed therein which are adapted to receive the tags 24 as illustrated in FIG. 4. Thus, the member 28 may be removably positioned within the shoulder 22 as illustrated in FIGS. 3 and 4. As seen in FIG. 4, the inner ends of the shoulder 22 extend slightly over the edges of the member 28 and serve to maintain the member 28 in position. In the preferred embodiment, as illustrated in FIG. 4, an insecticide impregnated member 28' is also positioned on the back side of the tag. However, the tag will function with only a single insecticide impregnated member thereon.

The tag of this invention is preferably comprised of a suitable plastic material. The insecticide which is impregnated in the member 28 is impregnated thereon in conventional fashion and is comprised of the following:

| ACTIVE INGREDIENTS: | |
|---|---|
| Permethrin | 10.0% |
| (3-phenoxyphenyl) methyl (±) cis, trans-3-(2-dichloroethenyl)-2,2-dimethylcyclopropane-carboxylate* | |
| INERT INGREDIENTS | 90.0% |
| | 100.0% |

*cis/trans ratio: 25% cis and 75% trans

Although the above insecticide is the preferred insecticide, it should be noted that other types of insecticides commonly available to the industry may be used.

Thus it can be seen that a novel insecticide ear tag has been provided which permits the insecticide impregnated members to be replaced without the necessity of reinserting an ear tagging pin through the animal's ear when the insecticide loses its potency. The insecticide impregnated members 28 and 28' may be easily and quickly removed and new members substituted therefor. Thus it can be seen that the invention accomplishes at least all of its stated objectives.

I claim:

1. An ear tag for an animal, comprising, a flat portion having opposite sides, means extending from said flat portion for attachment to the animal's ear, and an insecticide impregnated flat member detachably secured to said flat portion at least one side thereof said flat portion having a shoulder integral therewith which extends outwardly therefrom around the periphery of said insecticide impregnated flat member, said flat portion having a plurality of spaced-apart pegs extending therefrom within the area defined by said shoulder, said insecticide impregnated flat member having a plurality of openings formed therein which detachably receive said pegs.

* * * * *